E. P. MACKINTOSH.
PAINT-BRUSH ATTACHMENT.

No. 175,615.  Patented April 4, 1876.

WITNESSES.
Chas. G. Curtiss
Edward J. Mackintosh.

Edward P. Mackintosh
INVENTOR.

UNITED STATES PATENT OFFICE.

EDWARD P. MACKINTOSH, OF BROOKLYN, NEW YORK.

IMPROVEMENT IN PAINT-BRUSH ATTACHMENTS.

Specification forming part of Letters Patent No. 175,615, dated April 4, 1876; application filed March 11, 1876.

*To all whom it may concern:*

Be it known that I, EDWARD PAYSON MACKINTOSH, of Brooklyn, in the county of Kings and State of New York, have invented a certain new and useful Attachment for Paint, Varnish, or similar Brushes, of which the following is a full, clear, and exact description, reference being had to the accompanying drawings, forming part of this specification, in which—

Figure 1:
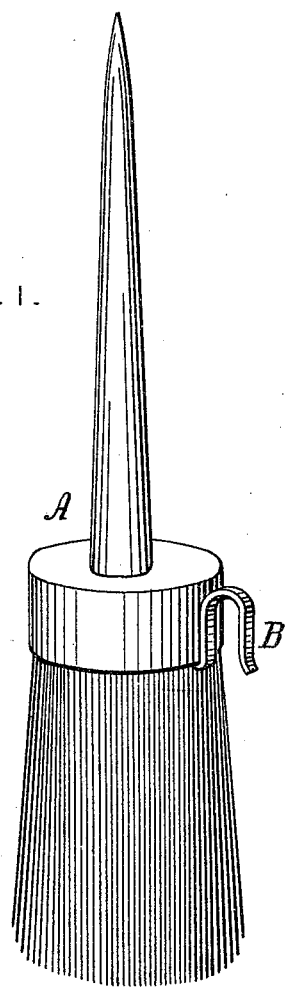
Figure 2:
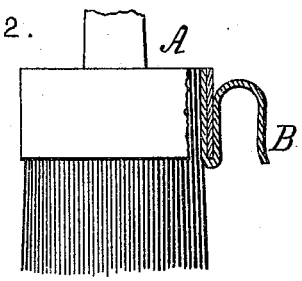

Figure 1 is a perspective view of a brush provided with my attachment. Fig. 2 is a detail view, showing the construction.

The object of my invention is to provide a simple and convenient means of hanging or suspending paint, varnish, or similar brushes from the rim of the pot or pail commonly used by painters, thereby causing the upper part of the brush to be kept free from the contents of said pot or pail, and also preventing the bristles from becoming permanently bent, as would be the case if the brush were allowed to rest upon the bottom of the pot or pail.

To enable those skilled in the arts to make and use my invention, I will describe the same.

A is a brush of any suitable construction. B is my attachment, consisting of a piece of wire or other suitable material fastened to the brush A, and bent in such a manner as to produce a hook or projection, which engages, when desired, with the rim of the pail, and so holds the brush suspended.

In Fig. 2 I have shown one method of construction, which consists of bending a prolongation of the hook back upon itself, and inserting said prolongation between the ferrule and the bristles of a brush. I would state that I am aware that the hook may be connected to the brush in other ways than described, such as by soldering to the outside of ferrule, or by securing to handle by tacking or binding, but consider the method shown in Fig. 2 as preferable.

Having described my invention, what I claim as new, and desire to secure by Letters Patent, is—

The combination of the hook or projection B with the brush A, substantially as described, and for the purposes set forth.

EDWARD P. MACKINTOSH.

Witnesses:
CHAS. G. CURTISS,
EDWARD D. MACKINTOSH.